US007953193B2

(12) United States Patent
Perlow et al.

(10) Patent No.: US 7,953,193 B2
(45) Date of Patent: May 31, 2011

(54) SPARSE CHANNEL EQUALIZATION

(75) Inventors: Randall Perlow, Aliso Viejo, CA (US); Nabil R. Yousef, Foothill Ranch, CA (US); Charles Alan Brooks, Laguna Beach, CA (US); Tianmin Liu, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 923 days.

(21) Appl. No.: 10/386,795

(22) Filed: Mar. 12, 2003

(65) Prior Publication Data

US 2004/0179483 A1 Sep. 16, 2004
US 2011/0002242 A9 Jan. 6, 2011

Related U.S. Application Data

(63) Continuation-in-part of application No. 10/109,496, filed on Mar. 28, 2002, now Pat. No. 7,224,726.

(51) Int. Cl.
*H03D 1/06* (2006.01)
*H04B 1/10* (2006.01)
*H04L 25/08* (2006.01)

(52) U.S. Cl. ....................................... 375/346; 375/233
(58) Field of Classification Search .................. 375/229, 375/346, 231–233
See application file for complete search history.

(56) References Cited

U.S. PATENT DOCUMENTS

| 4,805,215 | A | * | 2/1989 | Miller ...................... 379/406.08 |
| 5,251,233 | A | * | 10/1993 | Labedz et al. ................. 375/230 |
| 5,323,422 | A | * | 6/1994 | Ushirokawa .................. 375/232 |
| 5,777,910 | A | * | 7/1998 | Lu .................................. 708/323 |
| 6,687,188 | B2 | * | 2/2004 | Yang ............................. 367/134 |
| 6,775,322 | B1 | * | 8/2004 | Zangi et al. .................... 375/232 |
| 6,907,092 | B1 | * | 6/2005 | Yakhnich et al. ............. 375/346 |
| 6,968,001 | B2 | * | 11/2005 | Jayaraman et al. ........... 375/231 |
| 2002/0131488 | A1 | * | 9/2002 | Allpress et al. ............... 375/233 |
| 2002/0131490 | A1 | * | 9/2002 | Allpress et al. ............... 375/233 |
| 2002/0159543 | A1 | * | 10/2002 | Perlow et al. ................. 375/324 |
| 2003/0081669 | A1 | * | 5/2003 | Yousef et al. ................. 375/233 |
| 2003/0152170 | A1 | * | 8/2003 | Yousef .......................... 375/340 |
| 2003/0161421 | A1 | * | 8/2003 | Schmidt et al. ............... 375/346 |
| 2004/0101068 | A1 | * | 5/2004 | Wang et al. ................... 375/324 |
| 2004/0179589 | A1 | * | 9/2004 | Yousef et al. ................. 375/233 |
| 2004/0196935 | A1 | * | 10/2004 | Nieto ............................ 375/350 |

OTHER PUBLICATIONS

Naofal M. W. Al-Dhahir and John M. Cioffi, "MMSE Decision Feedback Equalizers: Finite-Length Results," Information Systems Laboratory, Electrical Engineering Department, Stanford University, pp. 1-27, 1993.

* cited by examiner

*Primary Examiner* — Young T. Tse
(74) *Attorney, Agent, or Firm* — Garlick Harrison & Markison; Jessica W. Smith

(57) ABSTRACT

Sparse channel equalization may be achieved by receiving a signal via a multi-path communication channel. The equalization then continues by extracting sparse information regarding the multiple path communication channel from the signal. Such sparse information generally indicates the position of the signals received via each of the multiple paths. The equalization then continues by estimating a channel response of the multiple path communication channel based on the sparse information. The equalization then continues by generating equalization taps (or coefficients) based on the channel response. The equalization then continues by equalizing the signal based on the equalization taps.

28 Claims, 7 Drawing Sheets

(example)

prior art receiver prior art equalizer channel equalizer 10 channel equalizer 30 sparse channel** equalizing module
32 and/or 36**

SPARSE CHANNEL EQUALIZATION

CROSS REFERENCE TO RELATED APPLICATIONS

This application claims priority as a continuation-in-part application under 35 U.S.C. §120 to application Ser. No. 10/109,496 filed Mar. 28, 2002, entitled, "System and Method for Terrestrial High Definition Television Reception," to Randall Perlow, et al., now U.S. Pat. No. 7,224,726 issued May 29, 2007.

BACKGROUND OF THE INVENTION

1. Technical Field of the Invention

This invention relates generally to communication systems and more particularly to equalization of channel response in a receiver operating in a communication system.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), broadcast standard television (NTSC), broadcast high definition television (HDTV), satellite broadcasts, local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, television receiver, home entertainment equipment, et cetera communicates directly or indirectly with other wireless communication devices or receives broadcast wireless communications. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network. For broadcast communications, a broadcasting station transmits via a transmitting tower a wireless communication (e.g., an HDTV broadcast, an NTSC broadcast, etc.) to wireless communication devices (e.g., television, satellite receiver, HDTV, etc.) via a wireless communication channel in the UHF (ultra high frequency) and/or VHF (very high frequency) frequency range.

FIG. 1 illustrates an example of a broadcast wireless communication or reception of an indirect wireless communication via a base station or access point. As shown, a transmitting tower (base station or access point) transmits a radio frequency signal. A receiving wireless communication device, which may be a television, HDTV, cellular telephone, satellite receiver, radio, etc., receives the signal via multiple paths. In this example, the receiving wireless communication device receives the signal via four paths, i.e., via a multiple path communication channel. Via the first path, the signal reflects off of an object, which may be a building, mountain, hill, truck, etc. Via the second path, the signal reflects off of one or more buildings. The third path is a direct line of sight path, even though intervening objects may be positioned between the transmitting tower and the receiving device, where the objects may attenuate the signal. Via the fourth path, the signal reflects off of the ground.

Depending on the distance between the transmitting tower and the receiving device, attenuation properties of intervening objects, and the path in which the signal traverses, the receiving device receives multiple representations of the signal at different times with different signal strengths. FIG. 2 is a graphical diagram that depicts the multiple path communication channel of FIG. 1. As shown, at time t0, the transmitting tower transmits a signal at a certain power level (i.e., signal strength). At some time later, which depends the length of the path over which the signal traverses, the receiving devices receives the signal. As shown, the receiving device first receives the signal via path 3, then the signal via path 2, then the signal via path 1, and finally via path 4. As is also shown, the signal strength of the signal received via the different paths is varied. The received signal strength is dependent on the impedance (i.e., resulting in attenuation of the signal) of the path over which the signal traverses. In this example, even though path 3 is a line of sight path, it attenuates the signal more than reflected path 2.

For a wireless communication device to participate in wireless communications, it includes a receiver and may further include a transmitter. As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

The receiver may be constructed as illustrated in FIG. 3. Such a receiver includes an antenna, a receiver (Rx) filter module, a low noise amplifier (LNA), a down-conversion module, a local oscillation module, an analog to digital converter (ADC), an equalizer, and a data recovery module. In general, the antenna receives radio frequency (RF) signals and provides them to the Rx filter module. The Rx filter module band pass filters the received RF signals to pass RF signals in a certain frequency range. The Rx filter module may be tunable such that the receiver may be adjusted to receive different channels (i.e., different RF signals).

The LNA amplifies the filtered RF signals and provides the amplified signals to the down-conversion module. The down conversion module converts the amplified RF signals into analog baseband signals based on one or more local oscillations provided by the local oscillation module. The analog to digital converter converts the analog baseband signals into digital baseband signals. The equalizer, which will be discussed in greater detail with reference to FIG. 4, functions to reduce the adverse affects of the multiple-path via which the RF signals were received. Accordingly, the equalizer compensates for the timing differences of the received RF signal via the multiple paths and for the attenuation introduced by each of the multiple paths. The data recovery module receives the equalized signal and recovers the data therefrom.

FIG. 4 illustrates a discrete time symbol-spaced Decision Feedback Equalizer (DFE). The equalizer includes a Feed Forward Equalizer (FFE) 104, a Decision block 106, and a Feed Back Equalizer (FBE) 108. The equalizer receives an input sequence y(n) via a channel, where y(n) is complex and is corresponds to the transmit signal x(n), which is also complex, attenuated by the channel [H(z)] and noise of the channel [v(n)]. Additive noise v(n) is white Gaussian with power spectral density $\sigma_v^2$. Furthermore, the decisions x̌(n−δ) are assumed to be correct, and hence equal to x(n−δ). This assumption makes the design of the FBE 108 and FFE 104 easier, but at the expense of introducing error propagation due to possibly wrong decisions. The FFE 104 function G(z) has length L. The channel (impulse) response vector of the channel h is given in Equation (1) as:

$$h: = [h(0) h(1) \ldots h(N-1)] \quad \text{Equation (1)}$$

The number of coefficients (taps) M of the FBE 108 function B(z) is assumed greater or equal to the channel memory, i.e., M≥N−1. These modeling assumptions are feasible in practice.

In estimating FFE 104 and FBE 108 equalizer coefficients, the goal is to minimize the mean square error quantity of Equation (2).

$$\zeta = E|x(n-\delta) - \hat{x}(n-\delta)|^2, \quad \text{Equation (2)}$$

where x̂(n−δ) is the delayed input signal estimate prior to the Decision block 106. By collecting the coefficients of both G(z) and B(z) into vectors, we can express the received signal x̂(n−δ) in Equation (3) as:

$$x_n = y_n g - \check{x}_n b \quad \text{Equation (3)}$$

A channel output model defining $y_n$ may be expressed by:

$$y_n = x_n H + v_n \quad \text{Equation (4)}$$

where H is the (N+L−1)×L convolution matrix corresponding to the channel response and expressed as:

$$H = \begin{bmatrix} h(0) & 0 & \ldots & 0 \\ h(1) & h(0) & \ldots & 0 \\ \vdots & \vdots & \ddots & \vdots \\ h(N-1) & h(N-2) & \ddots & h(0) \\ 0 & h(N-1) & \ddots & h(1) \\ \vdots & \vdots & \ddots & \vdots \\ 0 & 0 & \ldots & h(N-1) \end{bmatrix} \quad \text{Equation (5)}$$

In this model, $x_n$ is the 1×(N+L−1) input vector, $$x_n: = [x(n) x(n-1) \ldots x(n-N-L+2)] \quad \text{Equation (6)}$$

$y_n$ is the 1×L input regression vector to the FFE 104, $$y_n: = [y(n) y(n-1) \ldots y(n-L+1)] \quad \text{Equation (7)}$$

$\check{x}_n$ is the 1×M input regression vector to the (strictly causal) FBE 108, $$\check{x}_n: = [x(n-\delta-1) x(n-\delta-2) \ldots x(n-\delta-M)] \quad \text{Equation (8)}$$

and $v_n$ is the 1×L vector noise process.

The current efficient methods for computing the optimal filter coefficients of a decision feedback equalizer, which optimizes (1), are based on the well-known Cholesky decomposition method (from a finite-dimension problem formulation). Two published papers: (1) N. Al-Dhahir and J. M. Cioffi, "MMSE Decision-Feedback Equalizers: Finite-Length Results," IEEE Trans. on Information Theory, vol. 41, no. 4, pp. 961-973, Jul. 1995; and (2) N. Al-Dhahir and J. M. Cioffi, "Fast Computation of Channel-Estimate Based Equalizers in Packet Data Transmission," IEEE Trans. on Signal Processing, vol. 43, no. 11, pp. 2462-2473, November 1995 provide one procedure for computing optimal DFE settings. These equations are referred to hereinafter as "Al-Dhahir's equations."

As can be ascertained for the above discussion, the determination of filter coefficients, or taps, for an equalizer is an involved process and requires a substantial amount of computational power to adequately equalize signals in today's high performance wireless communication devices. In some applications, long filters are needed, for example for HDTV channels, where implementing such long filters for channel estimation, tap computation, and equalization have practical limitations due to the need for a large number of coefficient multipliers. Furthermore, computing the taps of such long equalizer would also require a large number of multipliers, which, on a per multiplier basis, occupies a relatively large integrated circuit die area.

Therefore, a need exists for an equalizer that can meet the challenges of today's high performance wireless communication devices, provides accurate channel estimation, tap computation and equalization for long filters while reducing the number of multipliers.

BRIEF SUMMARY OF THE INVENTION

These needs and others are substantially met by the sparse channel equalization of the present invention. In one embodiment, a method for sparse channel equalization begins by receiving a signal via a multi-path communication channel. The signal may be any radio frequency transmission including high definition television broadcast. The method then continues by extracting sparse information regarding the multiple path communication channel from the signal. Such sparse information generally indicates the position of the signals received via each of the multiple paths. The method then continues by estimating a channel response of the multiple path communication channel based on the sparse information. The method then continues by generating equalization taps (or coefficients) based on the channel response. The method then continues by equalizing the signal based on the equalization taps. Accordingly, by utilizing the sparse information to estimate the channel response and correspondingly generate the equalization taps, an equalizer is achieved that provides accurate channel estimation, tap computation, and equalization for long filters while reducing the number of multipliers.

In another embodiment, a method for sparse channel equalization begins when a signal is received via a multiple path communication channel. The method continues by estimating a channel response of the multiple path communication channel. The method continues by utilizing a portion of the channel response to generate equalization taps (or coefficients). For example, by determining taps of the channel response that have significant energy, and ignoring the taps of insignificant energy, the equalization taps may be generated for the channel taps having the significant energy. The method then continues by equalizing the signal based on the equalization taps. By equalizing a signal in this manner, accurate channel estimation, tap computation and equalization is obtained for long filters while reducing the number of multipliers required for such filtering.

DETAILED DESCRIPTION OF THE INVENTION

Figure 5:
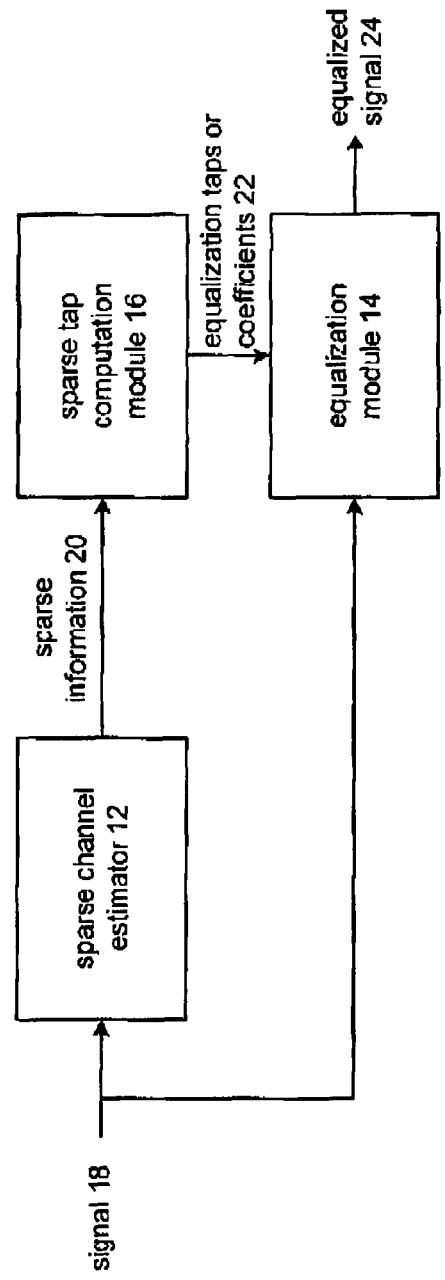
FIG. 5 is a schematic block diagram of a channel equalizer in accordance with the present invention.

FIG. 5 is a schematic block diagram of a channel equalizer 10 that includes a sparse channel estimator 12, a sparse tap computation module 16 and an equalization module 14. The sparse channel estimator 12 is operably coupled to receive a signal 18 via a multiple path communication channel. The signal 18 may be any radio frequency (RF) signal, for example, but not limited to, broadcast television, high definition broadcast television, cellular telephone transmissions and satellite transmission. In general, the multiple path communication channel includes a number of paths, where, from path to path, there is a relatively significant difference in length. As such, to filter such a multiple path communication channel, a long filter (i.e., a filter requiring thousands of coefficient taps) is needed. However, when the number of paths within the multiple path communication channel is relatively small, such as the case for HDTV, a significant number of the taps in the long filter are zero or near zero, thus are insignificant. Accordingly, the sparse channel estimator 12 generates sparse information 20 or a sparse channel estimate, which will be described in greater detail with reference to FIGS. 7, 10-12, that indicates where there is significant energy of the multiple path communication channel, i.e., channel taps of the multiple path communication channel.

The sparse tap computation module 16 receives the sparse information 20 and generates equalization taps, or coefficients, 22 there from. The sparse tap computation module 16 interprets the sparse information 20 to identify locations within the channel estimate where the taps of the filter will be non-zero, or above some threshold greater than zero. For each of these identified locations, the sparse tap computation module 16 generates a corresponding equalization tap value. The various methodologies for generating the equalization taps will be described in greater detail with reference to FIGS. 10-12.

The equalization module 14, which may be a linear equalizer or feedback equalizer, receives the equalization taps 22 to generate a corresponding filter. The equalization module 14 then filters the signal 18 to produce an equalized signal 24. The equalization module 14 will be described in greater detail with reference to FIGS. 6 and 8.

Figure 1:
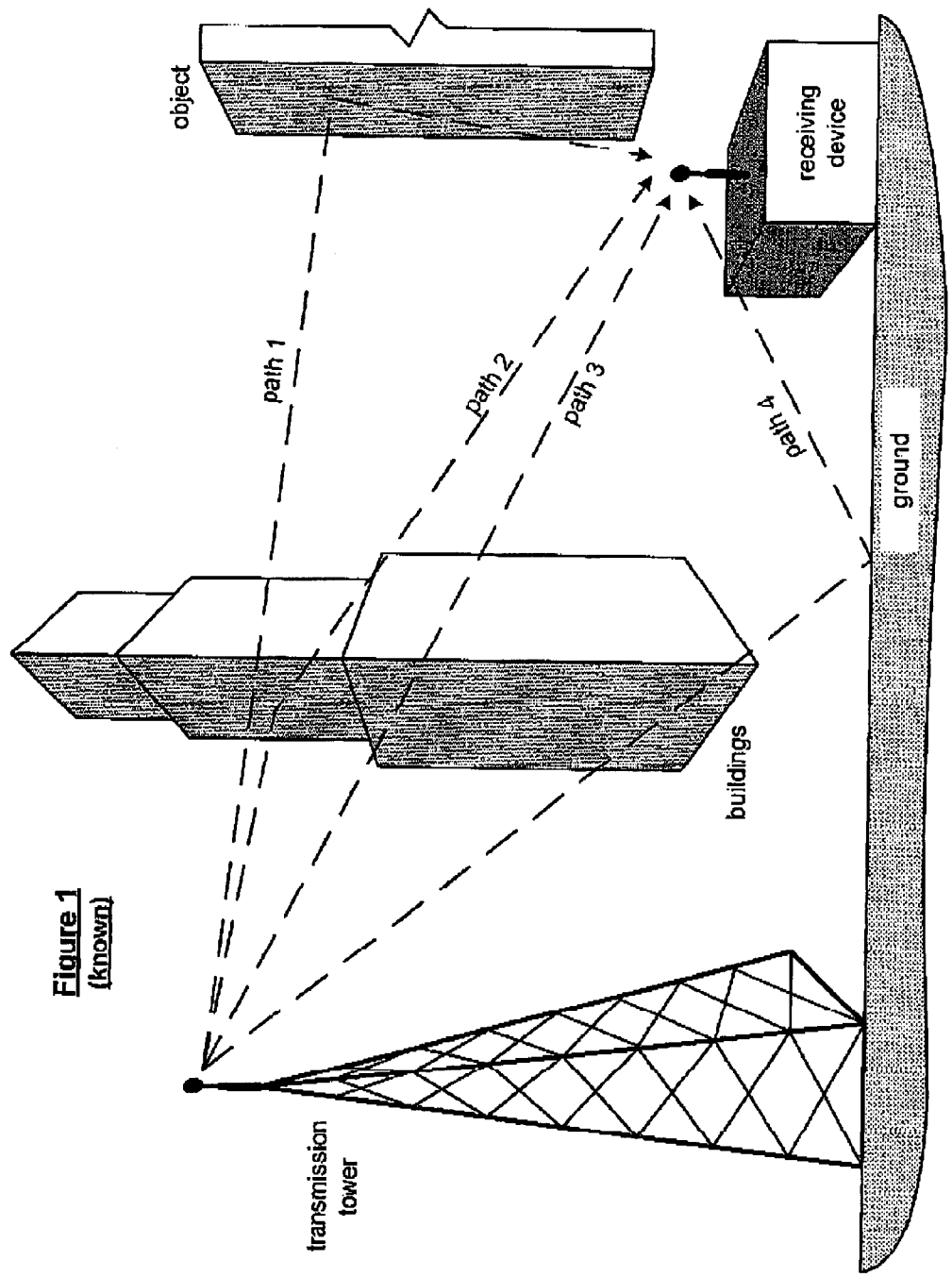
FIG. 1 is a graphical representation of known multiple path communications.
Figure 2:
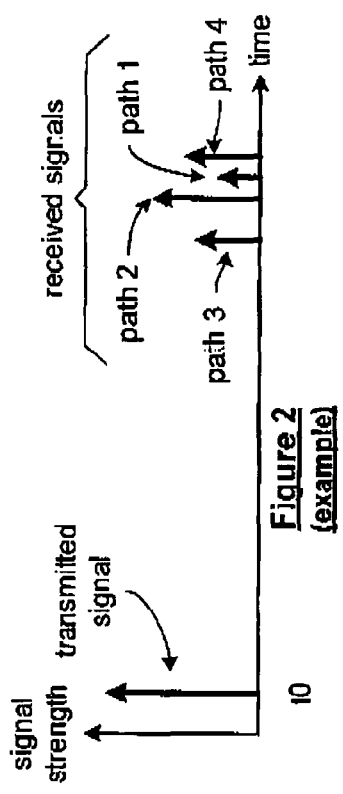
FIG. 2 is a graphical representation of multiple path communications.
Figure 3:
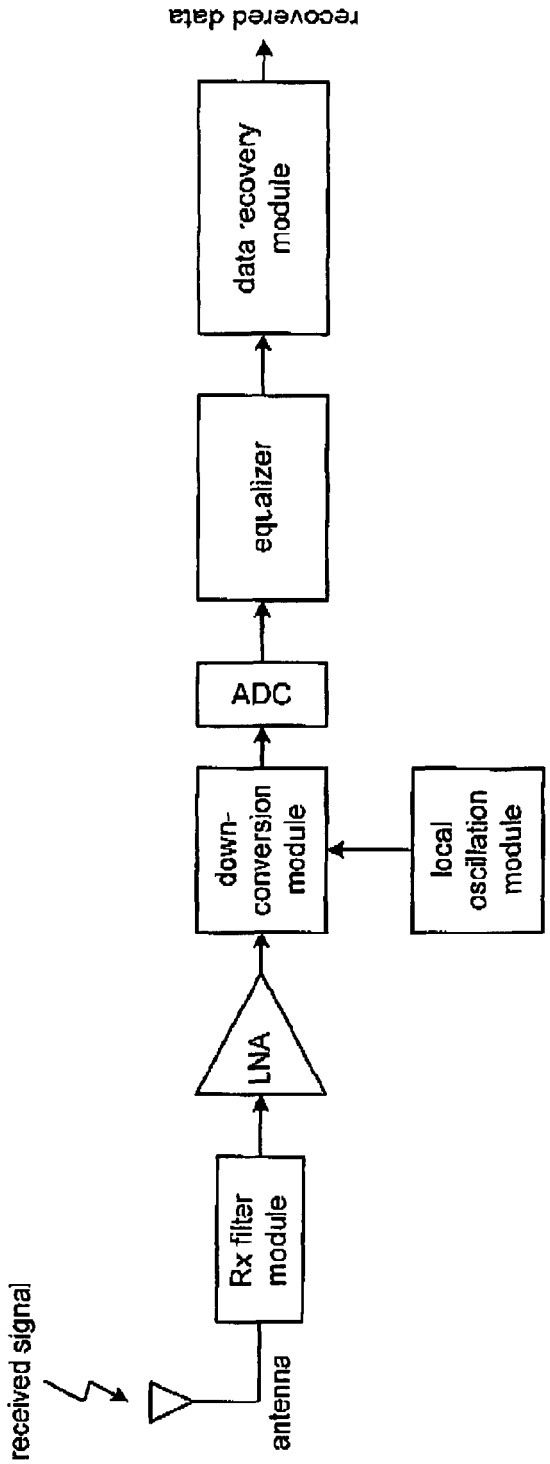
FIG. 3 is a schematic block diagram of a prior art receiver.
Figure 4:
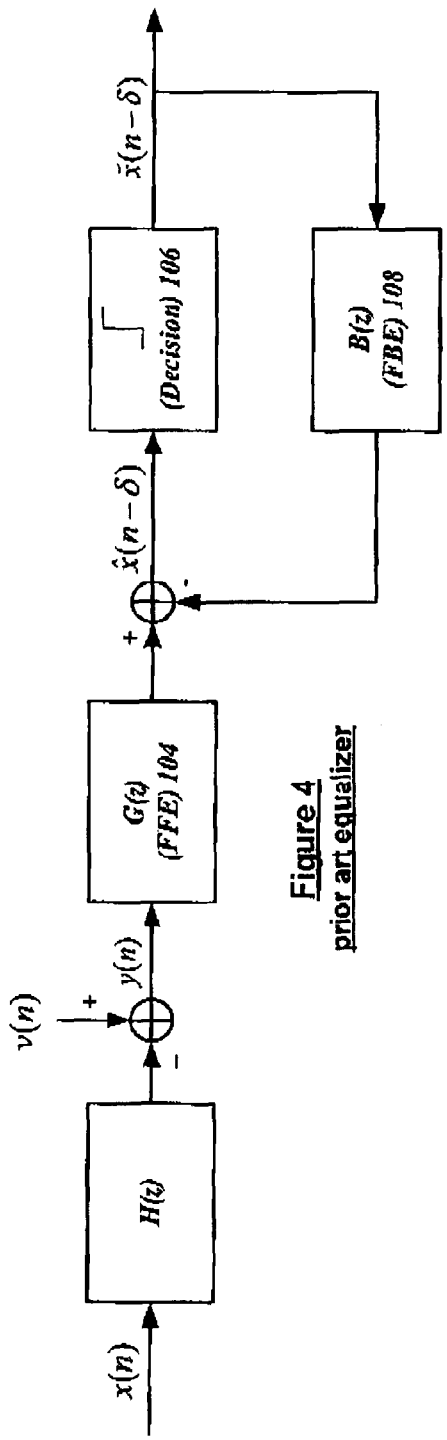
FIG. 4 is a schematic block diagram of a prior art equalizer.

The channel equalizer 10 may be incorporated in the receiver shown in FIG. 3 replacing the equalizer shown in FIG. 4. By utilizing a channel equalizer 10, as illustrated in FIG. 5, in a receiver of a wireless communication device, the channel equalizer 10 provides accurate channel estimation, tap computation, and equalization for the long filtering needed within such wireless communication systems while reducing the number of multipliers needed for such filtering.

Figure 6:
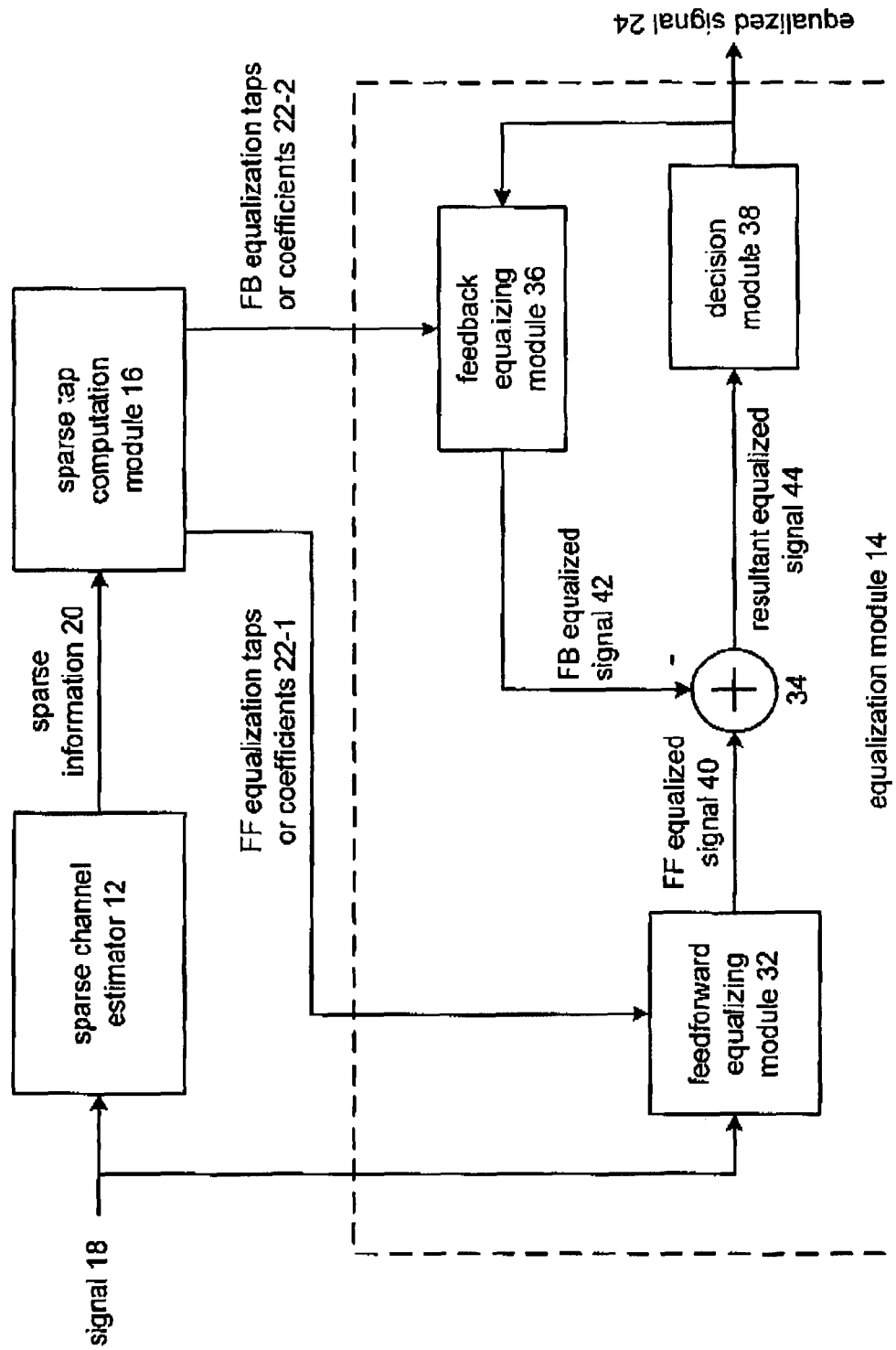
FIG. 6 is a schematic block diagram of another channel equalizer in accordance with the present invention.

FIG. 6 is a schematic block diagram of an alternate embodiment of a channel equalizer 30. The channel equalizer 30 includes the sparse channel estimator 12, the sparse tap computation module 16 and the equalization module 14. In this embodiment, the equalization module 14 is configured as a feedback equalizer and includes a feed-forward equalizing module 32, a subtraction module 34, a feedback equalizing module 36 and a decision module 38. The decision module 38 may function similarly to the decision module illustrated in the prior art equalizer of FIG. 4. Accordingly, the decision module may generate a hard-slicing decision and/or a soft-slicing decision.

The sparse tap computation module 16 generates feed-forward (FF) equalization taps 22-1 and feedback (FB) equalization taps 22-2 from the sparse information 20. The generation of the feed-forward and feedback equalization taps 22-1 and 22-2 will be described in greater detail with reference to FIG. 12.

The feed-forward equalizing module 32 receives the signal 18 and filters it based on the feed-forward equalization tap 22-1 to produce a feed-forward equalized signal 40. The feedback equalizing module 36 filters the outputted equalized signal 24 based on the feedback equalization taps 22-2 to produce a feedback equalized signal 42. The subtraction module 34 subtracts the feedback equalized signal 42 from the feed-forward equalized signal 40 to produce a resultant equalized signal 44. The decision module 38 operates on the resultant equalized signal 44 to produce the equalized signal 24.

Figure 7:
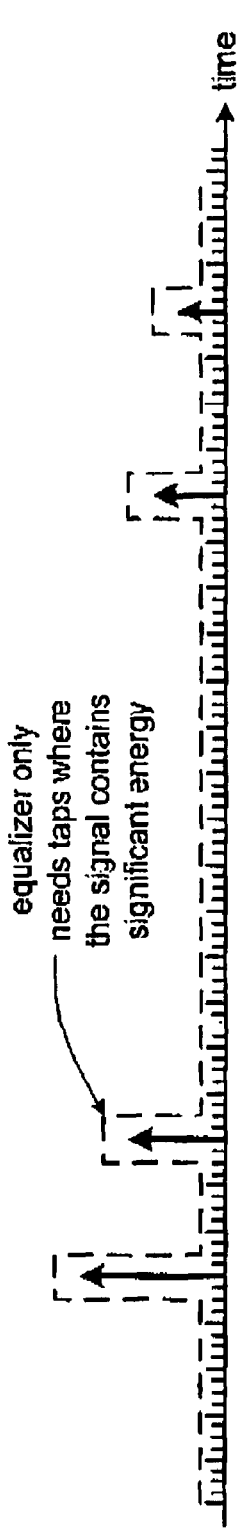
FIG. 7 is a graphical representation of a sparse channel in accordance with the present invention.

FIG. 7 is a graphical representation of a sparse channel in accordance with the present invention. In this illustration, a multiple path communication channel includes only 4 paths, which are indicated by the vertical arrowed lines. As is also shown, the energy of the multiple paths is separated in time by a relatively substantial amount. As such, between each energy pulse corresponding to the multiple path channel there are large amounts of insubstantial energy. Accordingly, the generation of the equalizer only needs to compensate for the channel where there is significant energy. Accordingly, where there is insignificant energy in the channel estimate, the corresponding taps of the equalizer may be zero. As such, a long filter for a sparse channel which may require thousands or tens-of-thousands of taps to accurately filter a multiple path channel, may only have 30-40 non-zero taps. Accordingly, the equalizer may be configured and hence constructed, to include a minimal number of multipliers (e.g., 30 to a couple of hundred) while still providing accurate channel estimation, tap computation, equalization for long filters.

Figure 8:
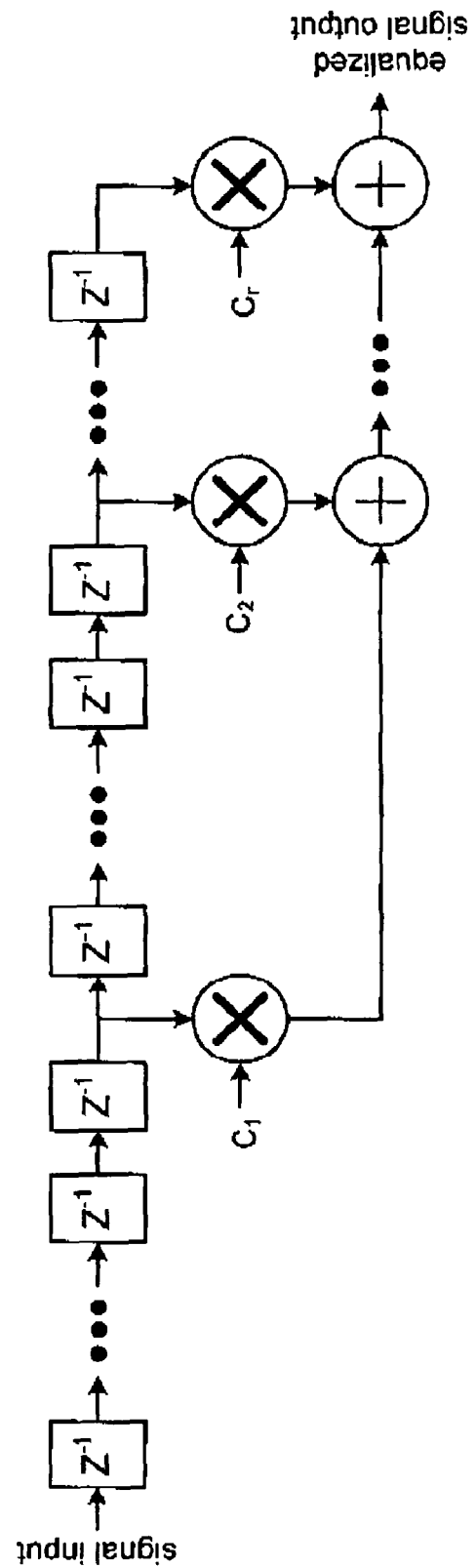
FIG. 8 is a schematic block diagram of an equalizing module in accordance with the present invention.

FIG. 8 is a schematic block diagram of an equalizing module 32 and/or 34 of FIG. 6. Note that if the channel equalizer 10 is implemented as a linear equalizer, the equalization module 14 may be implemented as illustrated in FIG. 8. In this illustration, the equalizing module includes a plurality of delay elements ($Z^{-1}$), a plurality of multipliers, and a plurality of adders. In this illustration, there are substantially less multipliers and adders than there are delay elements. In particular, the equalizing module may be configured to provide the multipliers and corresponding adders at non-zero taps of the equalizer. The zero taps are implemented by a delay block. For example, if the $1^{st}$ 100 taps of the filter have a zero coefficient, the equalizing module would begin with 100 delay elements before including a multiplier.

For the $1^{st}$ non-zero coefficient ($C_1$), the output of the corresponding delay element would be multiplied by the coefficient wherein the product of the multiplier would be summed with the next multiplication of a coefficient with the delay line.

Such an equalizing module may be configured based on the positioning of the non-zero equalizer taps. As such, such an equalizing module only requires a limited number of multipliers which, when implemented as an integrated circuit, substantially reduces the die area requirement in comparison to equalizers that have a multiplier for each tap. In addition, since a significant number of the taps are zero or negligible, the equalizer of the present invention suffers no, or little, loss in accuracy when computing the channel estimate, taps, and/or performing the equalization in comparison with equalizers that have multipliers for each tap. As one of average skill in the art will appreciate, the delay line may be tapped at any number of locations, based on the number of multipliers provided within the equalizer to achieve the equalization of a sparse channel in accordance with the present invention. Accordingly, the number of multipliers included within the equalizing module depends on the sparseness of the channel. The more sparse the channel, the less multipliers needed, and conversely, the less sparse the channel, the more multipliers needed.

Figure 9:
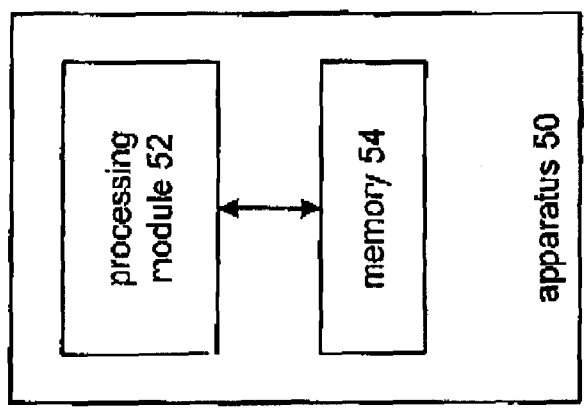
FIG. 9 is a schematic block diagram of an apparatus for sparse channel equalization in accordance with the present invention.

FIG. 9 is a schematic block diagram of an apparatus for sparse channel estimation and/or for equalizer coefficient determination from a sparse channel estimate. The apparatus 50 includes a processing module 52 and memory 54. The processing module 52 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 54 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 52 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 54 stores, and the processing module 52 executes, operational instructions corresponding to at least some of the steps and/or functions illustrated in FIGS. 10-12.

Figure 10:
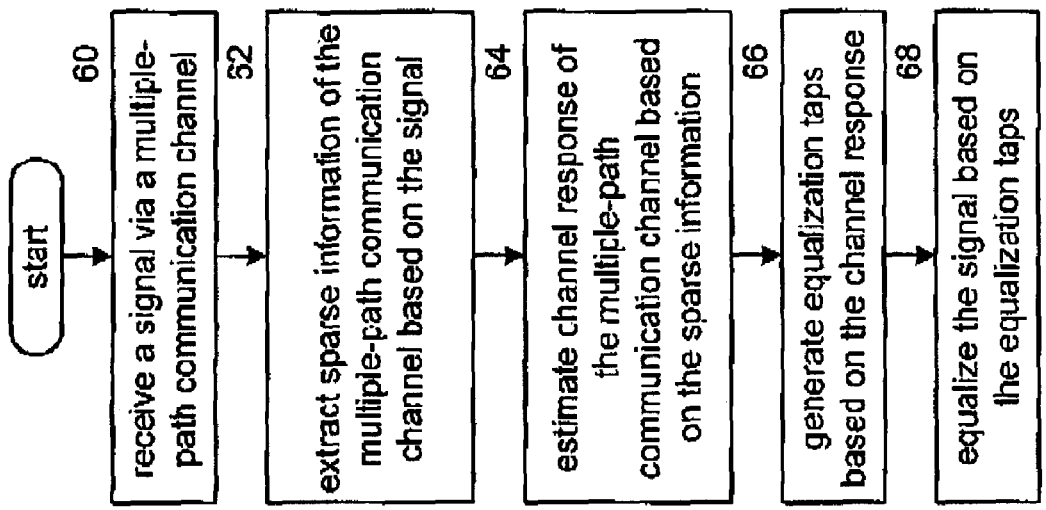
FIG. 10 is a logic diagram of a method for sparse channel equalization in accordance with the present invention.

FIG. 10 is a logic diagram of a method for sparse channel equalization. The method begins at Step 60 where a receiver receives a signal via a multiple path communication channel. The signal may be any RF signal and in particular may be a high-definition television signal. The process then proceeds to Step 62 where sparse information regarding the multiple path communication channel is extracted based on the signal. The extraction and/or determining of the sparse information may be done in a variety of ways. For instance, the sparse information may be determined from at least one training sequence, wherein, from the training sequence, channel taps of the multiple path communication channel that have an energy equal to or greater than an energy threshold are determined by a least squares algorithm and/or an adaptive filtering algorithm. Alternatively, the channel taps may be determined based on long term correlations of the training sequence, or sequences, with a known training sequence. Still further, the channel taps may be determined by iteratively correlating at least one training sequence with a known training sequence. Having done such a correlation, the channel taps are iteratively determined by ascertaining a correlation peak of the correlating of the training sequence with the known training sequence. Once the location of a channel tap is determined, it is removed from the training sequence to produce a modified training sequence. The modified training sequence is correlated with the known training sequence. Based on this subsequent correlation, another correlation peak is identified to determine a location of another channel tap. This iterative process of determining the channel taps continues until all of the channel taps have been determined.

The channel taps may still further be determined by determining their locations in accordance with a matching pursuit algorithm. Once the initial channel taps have been determined, they may be updated based on a data signal being received. As such, the sparse information (i.e., the determination of the energy peaks of the channel estimate), which was graphically illustrated in FIG. 7, are determined and may be subsequently updated as data is received via the multiple path communication channel.

The process then proceeds to Step 64 where the channel response of the multiple path communication channel is estimated based on the sparse information. The process then proceeds to Step 66 where equalization taps are generated based on the channel response. The equalization taps may be generated in a variety of ways. For example, the equalization taps may be generated by first determining non-zero, or non-insignificant, coefficients for the equalization taps based on the location of the channel taps. For zero, or insignificant coefficient values, no equalization taps are generated. To determine the non-zero coefficients, a sparse channel pre-echo location may be determined from the channel main tap of the multiple path communication channel. From there, the location of the non-zero coefficients is determined as multiples of integer linear combinations of the sparse channel pre-echo location. Accordingly, by knowing the pre-echo location, the location of other channel taps (i.e., those corresponding to other paths within the multiple path communication channel), are determined as integer multiples or combination of integer multiples of the pre-echo location.

Alternatively, the equalization taps may be generated by determining a set of coefficients for the entire filter corresponding to the multiple path communication channel. Each of these coefficients is then compared with the threshold. The resultant equalization taps are generated for the coefficients that compare favorably (e.g., greater than) the threshold. As such, all coefficients that fall below the threshold, are deemed to be insubstantial, and thus would be set to zero. The equalization taps may be generated for a feed-forward equalizer and/or for a feedback equalizer. The generation of feed-forward equalization taps and feedback equalization taps will be described in greater detail with reference to FIG. 12.

The generation of the equalization taps may be further performed by determining a number of channel taps of the multiple path communication channel (i.e., the number of channel taps in sparse channel estimate). Next, the number of channel taps is compared with a hardware limitation of equalization taps (e.g., how many multipliers are available for the equalizer). When the number of channel taps exceeds the hardware limitation of equalization taps, the equalization taps are selected for certain ones of the channel taps to provide a best case channel equalization. For example, the equalization taps may correspond to the channel taps of greatest magnitude.

The process of generating the equalization taps may be further expanded by determining two sets of channel taps of the multiple path communication channel. The $1^{st}$ set of channel taps corresponds to energy peaks that exceed a $1^{st}$ threshold. The $2^{nd}$ set of channel taps corresponds to energy peaks that are above a $2^{nd}$ energy threshold but below the $1^{st}$. In this grouping of channel taps, equalization taps of the equalizer are generated only for the channel taps in the $1^{st}$ set (i.e., the channel taps having an energy level greater than the $1^{st}$ energy level threshold). During operation of the receiver, the $2^{nd}$ set of channel taps are monitored to determine whether any of the channel taps have their energy level increased above the $1^{st}$ energy level threshold. When this occurs, an equalization tap is generated for the channel tap in the $2^{nd}$ set having its energy level greater than the $1^{st}$ energy level threshold. In addition, the $1^{st}$ set of channel taps is monitored to determine whether energy of any one of the channel taps drops below the $1^{st}$ energy level threshold. When this occurs, the equalization tap may be removed for this particular channel tap. Accordingly, the generation of the equalization taps may be a dynamic process that updates regularly based on changes in the sparse channel estimate. Furthermore, the two different sets of taps could be adapted or monitored using two different adaptive step-sizes and/or error signals.

The process then proceeds to Step 68 where the signal is equalized based on the equalization taps. Accordingly, the equalization removes, or substantially removes, the adverse effects induced by the channel thus removing the adverse effects of the multiple paths. As such, by utilizing such a method to equalize a sparse channel, an equalizer is obtained that performs accurate channel estimation, tap computation and equalization while substantially reducing the number of multipliers required for such long filters.

Figure 11:
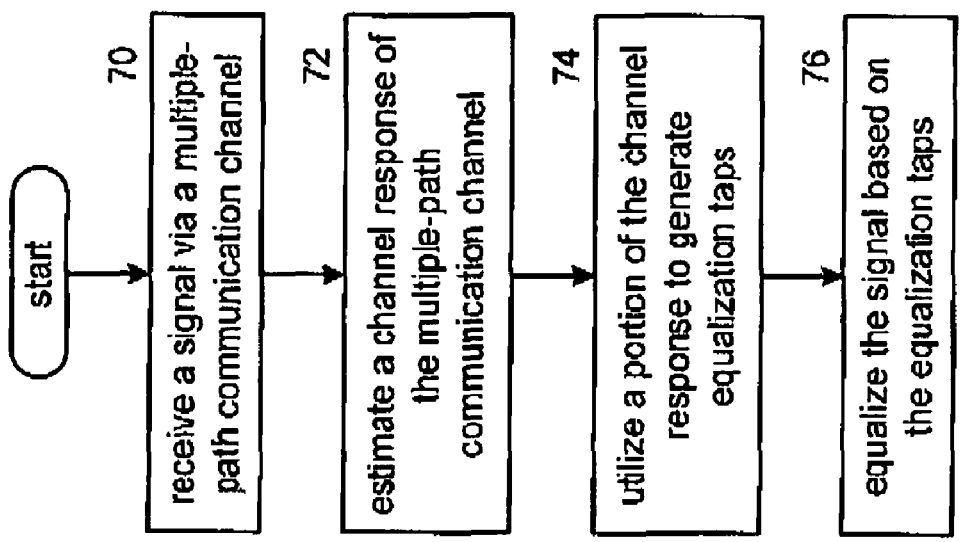
FIG. 11 is a logic diagram of an alternate method for sparse channel equalization in accordance with the present invention.

FIG. 11 is a logic diagram of an alternate method for sparse channel equalization. The method begins at Step 70 where a signal is received via a multiple path communication channel. The signal may be any RF signal including high-definition television broadcast. The process then proceeds to Step 72 where a channel response of the multiple path communication channel is estimated. This may be performed as previously described with reference to Steps 62 and 64 of FIG. 10.

The process then proceeds to Step 74 where a portion of the channel response is used to generate equalization taps. This may be done in a variety of ways. For instance, channel taps of the channel response that have an energy equal to or greater than an energy threshold are determined. Once the channel taps are determined, equalization taps are generated for the channel taps. The channel taps may be determined by identifying their locations based on a long term correlation of at least one training sequence with a known training sequence. Alternatively, the channel taps may be determined on an iterative basis by correlating the training sequence or sequences with a known training sequence to identify correlation peak. This correlation peak is used to identify the location of one channel tap. Once this channel tap is identified, it is removed from the channel estimate and a subsequent correlation is performed to identify another correlation peak. This correlation peak is used to determine the location of another channel tap. The iterative process is continued until each of the channel taps are identified. As yet a further alternative, the channel taps may be determined by performing a matching pursuit algorithm.

The process then proceeds to Step 76 where the signal is equalized based on the equalization taps. Accordingly, the equalization removes, or substantially removes, the adverse effects induced by the channel thus removing the adverse effects of the multiple paths. As such, by utilizing such a method to equalize a sparse channel, an equalizer is obtained that performs accurate channel estimation, tap computation and equalization while substantially reducing the number of multipliers required for such long filters.

Figure 12:
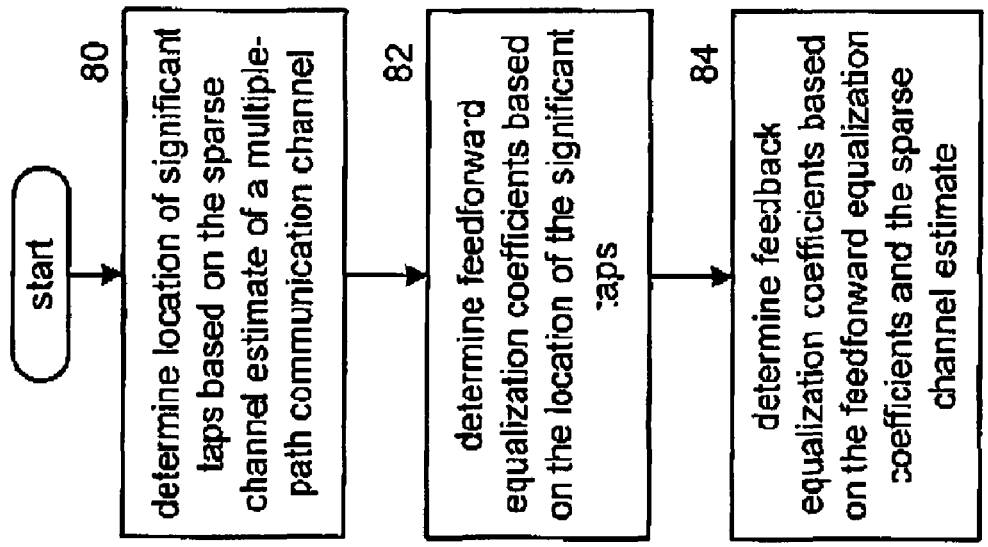
FIG. 12 is a logic diagram of a method for determining coefficients of a decision feedback equalizer from a sparse channel estimate in accordance with the present invention.

FIG. 12 is a logic diagram of a method for determining coefficients of a decision feedback equalizer from a sparse channel estimate. The process begins at Step 80 where location of significant taps is determined based on a sparse channel estimate of a multiple path communication channel. This may be done in a variety of ways. For example, a feed-forward tap computation may be performed in accordance with a delay line having a predetermined length to produce a plurality of taps. In other words, a feed-forward tap computation is performed on a long filter to identify all of the taps of the filter. The determination then continues by comparing energy level, or values, of each of the plurality of taps with a threshold. The processing continues by determining the location of the significant taps based on the comparing of the energy level of each tap with the threshold, where the significant taps are ones that compared favorably with the threshold. In a sparse multiple path communication channel, the number of significant taps should be substantially less than the predetermined length of the delay line.

The performance of the feed-forward tap computation may be done by performing limited finite precision feed-forward tap computation to generate the plurality of taps, where each of the plurality of taps have a course coefficient value. In other words, the determination of the significant taps may be done with a very limited precision feed-forward tap computation since the exact value is not the desired outcome but just their location. Note that the feed-forward tap computation may be performed as described in co-pending patent application entitled FAST COMPUTATION OF DECISION FEEDBACK EQUALIZER COEFFICIENTS, having a filing date of Oct. 26, 2001, and a U.S. Pat. No. 7,027,504, which is incorporated herein by reference in its entirety.

The process then proceeds to Step 82 where feed-forward equalization coefficients are determined based on the location of the significant taps. This may be done in a variety of ways. For instance, a least squares computation may be performed on the sparse channel estimate to obtain the feed-forward equalization coefficients. Such a least squares computation may be done by performing a fast transversal filter algorithm, or performing an Orthogonal-triangular decomposition (QR decomposition) fast transversal filtering algorithm. The fast transversal filtering algorithm includes performing iterations of the fast transversal filtering for non-zero coefficients of the feed-forward equalization coefficients. Such fast transversal filtering may be done in accordance with the above-referenced co-pending patent application.

The process then proceeds to Step 84 where feedback equalization coefficients are determined based on the feed-forward equalization coefficients and the sparse channel estimate. This may be done in a variety of ways. For example, the feedback equalization coefficients may be determined by performing a convolution of the sparse channel estimate with the feed-forward equalization coefficients. The convolution may be done by performing a fast-Fourier transform on the sparse channel estimate and the feed-forward equalization coefficients. By calculating the feed-forward and feedback equalizer coefficients in this manner, a high performance equalizer is achieved that accurately performs channel estimations, tap computations and equalization for long filters while reducing the number of multipliers required for such filtering.

The preceding discussion has presented a method and apparatus for sparse channel equalization and determining coefficients thereof. By leveraging the sparse nature of a multiple path communication channel, the hardware requirements for implementing an equalizer may be reduced and implemented in a configurable manner to obtain an equalizer that performs accurate channel estimation, tap computation and equalization for long filters while substantially reducing the number of multipliers needed to implement such filtering. As one of average skill in the art will appreciate, other embodiments may be derived from the teaching of the present invention without deviating from the scope of the claims.

What is claimed is:

1. A method for sparse channel equalization, comprising:
receiving a signal via a multiple-path communication channel;
extracting sparse information of the multiple-path communication channel based on the signal, wherein the extracting the sparse information comprises:
determining from at least one training sequence, which is at least part of the signal, channel taps of the multiple-path communication channel that have an energy equal to or greater than an energy threshold based on at least one of: a least squares algorithm and an adaptive filtering algorithm, wherein the determining the channel taps comprises:
determining locations of the channel taps by:
correlating the at least one training sequence with a known training sequence;
determining a location of a channel tap of the channel taps that corresponds to a correlation peak of the correlating of the at least one training sequence with the known training sequence;
removing the channel tap from the at least one training sequence to produce a modified training sequence;
correlating the modified training sequence with the known training sequence; and
determining a location of another channel tap of the channel taps that corresponds to a correlation peak of the correlating of the modified training sequence with the known training sequence;
estimating channel response of the multiple-path communication channel based on the sparse information;
generating equalization taps based on the channel response; and
equalizing the signal based on the equalization taps.

2. The method of claim 1, wherein the determining the channel taps comprises:
determining the locations of the channel taps based on long-term correlations of the at least one training sequence with the known training sequence.

3. The method of claim 1, wherein the determining the channel taps comprises:
determining the locations of the channel taps in accordance with a matching pursuit algorithm.

4. The method of claim 1 further comprises:
receiving a data signal as a part of the signal;
updating the sparse information based on the data signal; and
updating the equalization taps based on the updated sparse information.

5. The method of claim 1, wherein the generating the equalization taps comprises:
determining non-zero coefficients that correspond to the equalization taps based on the locations of the channel taps.

6. The method of claim 5, wherein the determining the non-zero coefficients comprises:
determining a sparse channel pre-echo location from a channel main tap of the multiple-path communication channel; and
determining locations of the non-zero coefficients as multiples of integer linear combinations of the sparse channel pre-echo location.

7. The method of claim 1, wherein the generating the equalization taps comprises:
determining a set of coefficients of the multiple-path communication channel;
comparing each coefficient of the set of coefficients with a threshold; and
generating the equalization taps based on coefficients of the set of coefficients that compared favorably to the threshold.

8. The method of claim 1, wherein the generating the equalization taps comprises at least one of:
generating feedforward equalization taps; and
generating feedback equalization taps.

9. The method of claim 1, wherein the generating the equalization taps comprises:
determining a number of channel taps of the multiple-path communication channel;
comparing the number of channel taps with a hardware limitation of equalization taps; and
when the number of channel taps exceeds the hardware limitation of equalization taps, corresponding the equalization taps to a selected set of the channel taps.

10. The method of claim 1, wherein the signal comprises a high definition television (HDTV) signal.

11. A method for sparse channel equalization, comprising:
receiving a signal via a multiple-path communication channel;
extracting sparse information of the multiple-path communication channel based on the signal;
estimating channel response of the multiple-path communication channel based on the sparse information;
generating equalization taps based on the channel response, wherein the estimating the channel response and generating the equalization taps include:
determining a first set of channel taps of the multiple-path communication channel as a first part of the channel response, wherein energy of each channel tap of the first set of channel taps equals or exceeds a first energy level threshold;
determining a second set of channel taps of the multiple-path communication channel as a second part of the channel response, wherein energy of each channel tap of the second set of channel taps equals or exceeds a second energy level threshold but is below the first energy level threshold;
generating the equalization taps based on the first set of channel taps; and
updating the equalization taps when at least one of energy of one of the second set of channel taps exceeds the second energy level threshold and energy of one of the first set of channel taps drops below the first energy level threshold; and
equalizing the signal based on the equalization taps.

12. A channel equalizer comprises:

a sparse channel estimator operably coupled to generate sparse information based on a signal received via a multiple-path communication channel, wherein the sparse channel estimator determines a channel response of the multiple-path communication channel based on the sparse information and wherein the sparse channel estimator determines the sparse information by:

determining from at least one training sequence, which is at least part of the signal, channel taps of the multiple-path communication channel that have an energy equal to or greater than an energy threshold based on at least one of: a least squares algorithm and an adaptive filtering algorithm, wherein the sparse channel estimator determines the channel taps by:

determining locations of the channel taps by:

correlating the at least one training sequence with a known training sequence;

determining a location of a channel tap of the channel taps that corresponds to a correlation peak of the correlating of the at least one training sequence with the known training sequence;

removing the channel tap from the at least one training sequence to produce a modified training sequence;

correlating the modified training sequence with the known training sequence; and determining a location of another channel tap of the channel taps that corresponds to a correlation peak of the correlating of the modified training sequence with the known training sequence;

a sparse tap computation module operably coupled to generate equalization taps based on the channel response; and an equalization module operably coupled to equalize the signal based on the equalization taps to produce an equalized signal.

13. The channel equalizer of claim 12, wherein the equalization module comprises:

a feedforward equalizing module operably coupled to equalize the signal based on feedforward equalization taps of the equalization taps to produce a feedforward equalized signal;

a subtraction module operably coupled to subtract a feedback equalized signal from the feedforward equalized signal to produce a resultant equalized signal;

a decision module operably coupled to produce the equalized signal from the resultant equalized signal based on at least one of a soft decoding decision and a hard decoding decision; and a feedback equalizing module operably coupled to equalize the equalized signal based on feedback equalization taps of the equalization taps to produce the feedback equalized signal.

14. The channel equalizer of claim 12, wherein the sparse channel estimator determines the channel taps by:

determining the locations of the channel taps based on long-term correlations of the at least one training sequence with the known training sequence.

15. The channel equalizer of claim 12, wherein the sparse channel estimator determines the channel taps by:

determining the locations of the channel taps in accordance with a matching pursuit algorithm.

16. The channel equalizer of claim 12, wherein the sparse channel estimator further functions to:

receive a data signal as a part of the signal;

update the sparse information based on the data signal; and update the equalization taps based on the updated sparse information.

17. The channel equalizer of claim 12, wherein the sparse tap computation module generates the equalization taps by:

determining non-zero coefficients that correspond to the equalization taps based on the locations of the channel taps.

18. The channel equalizer of claim 17, wherein the sparse tap computation module determines the non-zero coefficients by:

determining a sparse channel pre-echo location from a channel main tap of the multiple-path communication channel; and determining locations of the non-zero coefficients as multiples of integer linear combinations of the sparse channel pre-echo location.

19. The channel equalizer of claim 12, wherein the sparse tap computation module generates the equalization taps by:

determining a set of coefficients of the multiple-path communication channel;

comparing each coefficient of the set of coefficients with a threshold; and generating the equalization taps based on coefficients of the set of coefficients that compared favorably to the threshold.

20. The channel equalizer of claim 12, wherein the sparse tap computation module generates the equalization taps by at least one of:

generating feedforward equalization taps; and generating feedback equalization taps.

21. The channel equalizer of claim 12, wherein the sparse tap computation module generates the equalization taps by:

determining a number of channel taps of the multiple-path communication channel;

comparing the number of channel taps with a hardware limitation of equalization taps; and when the number of channel taps exceeds the hardware limitation of equalization taps, corresponding the equalization taps to a selected set of the channel taps.

22. A channel equalizer comprises:

a sparse channel estimator operably coupled to generate sparse information based on a signal received via a multiple-path communication channel, wherein the sparse channel estimator determines a channel response of the multiple-path communication channel based on the sparse information;

a sparse tap computation module operably coupled to generate equalization taps based on the channel response; and an equalization module operably coupled to equalize the signal based on the equalization taps to produce an equalized signal;

wherein the sparse channel estimator and the sparse tap computation module further function to:

determine a first set of channel taps of the multiple-path communication channel as a first part of the channel response, wherein energy of each channel tap of the first set of channel taps equals or exceeds a first energy level threshold;

determine a second set of channel taps of the multiple-path communication channel as a second part of the channel response, wherein energy of each channel tap of the second set of channel taps equals or exceeds a second energy level threshold but is below the first energy level threshold;

generate the equalization taps based on the first set of channel taps; and update the equalization taps when at least one of energy of one of the second set of channel taps exceeds the second energy level threshold and energy of one of the first set of channel taps drops below the first energy level threshold.

23. A method for sparse channel equalization, the method comprises:

receiving a signal via a multiple-path communication channel;

estimating a channel response of the multiple-path communication channel;

utilizing a portion of the channel response having an energy equal to or greater than an energy threshold to generate equalization taps, wherein utilizing the portion of the channel response includes:

determining channel taps of the channel response having the energy equal to or greater than the energy threshold, wherein the determining the channel taps includes determining locations of the channel taps based on long-term correlations of at least one training sequence with a known training sequence; and generating the equalization taps in accordance with the channel taps; and equalizing the signal based on the equalization taps.

24. The method of claim 23, wherein the determining the channel taps comprises:

determining the locations of the channel taps by:

correlating at least one training sequence with the known training sequence;

determining a location of a channel tap of the channel taps that corresponds to a correlation peak of the correlating of the at least one training sequence with the known training sequence;

removing the channel tap from the at least one training sequence to produce a modified training sequence;

correlating the modified training sequence with the known training sequence; and determining a location of another channel tap of the channel taps that corresponds to a correlation peak of the correlating of the modified training sequence with the known training sequence.

25. The method of claim 23, wherein the determining the channel taps comprises:

determining the locations of the channel taps in accordance with a matching pursuit algorithm.

26. An apparatus for sparse channel equalization, the apparatus comprises:

a processing module; and a memory operably coupled to the processing module, wherein the memory includes operational instructions that cause the processing module to:

receive a signal via a multiple-path communication channel;

estimate a channel response of the multiple-path communication channel;

utilize a portion of the channel response having an energy equal to or greater than an energy threshold to generate equalization taps by:

determining channel taps of the channel response having the energy equal to or greater than the energy threshold; and generating the equalization taps in accordance with the channel taps; and equalize the signal based on the equalization taps;

wherein the memory further includes operational instructions that cause the processing module to determine the channel taps by:

determining locations of the channel taps by:

correlating at least one training sequence with a known training sequence;

determining a location of a channel tap of the channel taps that corresponds to a correlation peak of the correlating of the at least one training sequence with the known training sequence;

removing the channel tap from the at least one training sequence to produce a modified training sequence;

correlating the modified training sequence with the known training sequence; and determining a location of another channel tap of the channel taps that corresponds to a correlation peak of the correlating of the modified training sequence with the known training sequence.

27. The apparatus of claim 26, wherein the memory further comprises operational instructions that cause the processing module to determine the channel taps by:

determining the locations of the channel taps based on long-term correlations of at least one training sequence with the known training sequence.

28. The apparatus of claim 26, wherein the memory further includes operational instructions that cause the processing module to determine the channel taps by:

determining the locations of the channel taps in accordance with a matching pursuit algorithm.

* * * * *